Feb. 5, 1952     P. G. J. M. AUDEMAR ET AL     2,584,659
HYDRAULIC TRANSMISSION SYSTEM FOR REPRODUCING
ROTARY MOVEMENTS AT A DISTANCE
Filed May 27, 1947     4 Sheets-Sheet 1
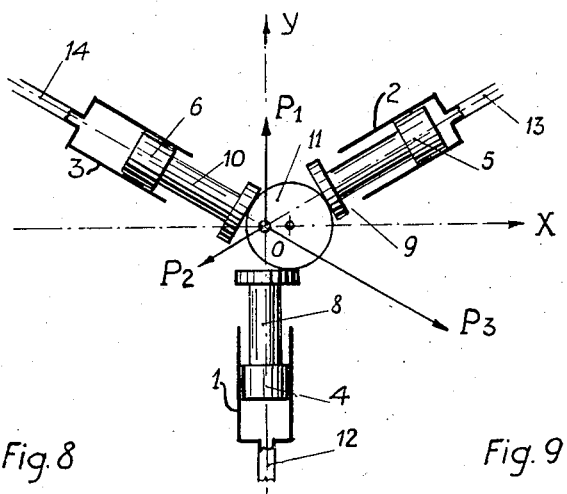
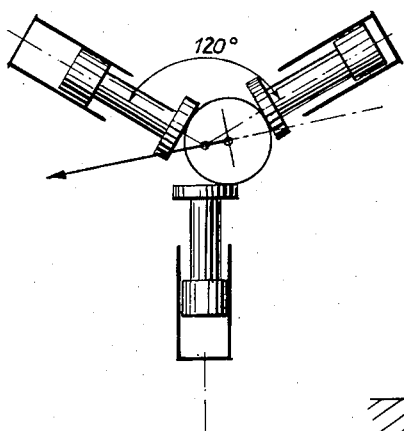
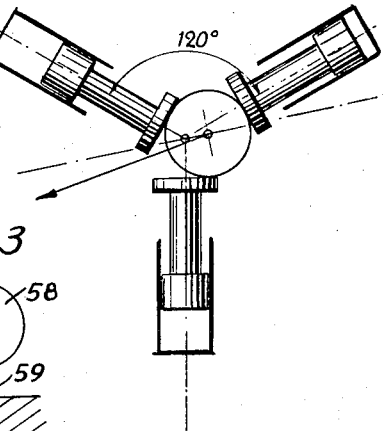
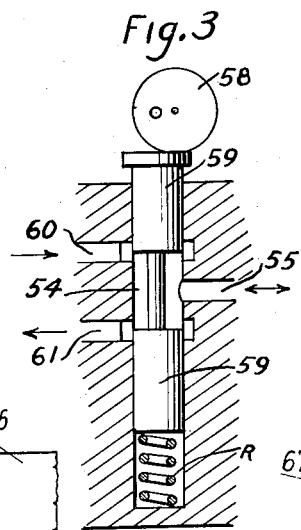
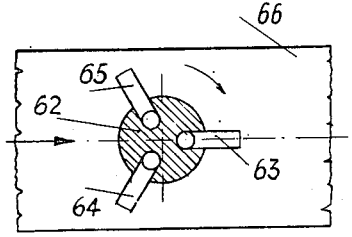
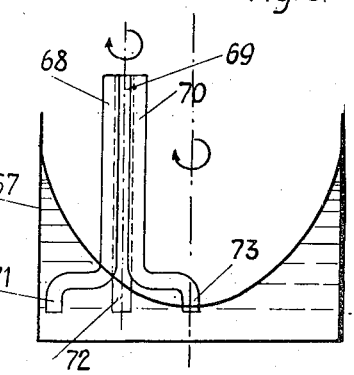
INVENTORS
PIERRE GUILLAUME JOSEPH MARIE AUDEMAR
PAUL LOUIS JULIEN GERARD
BY Otto Munk
THEIR ATT'Y

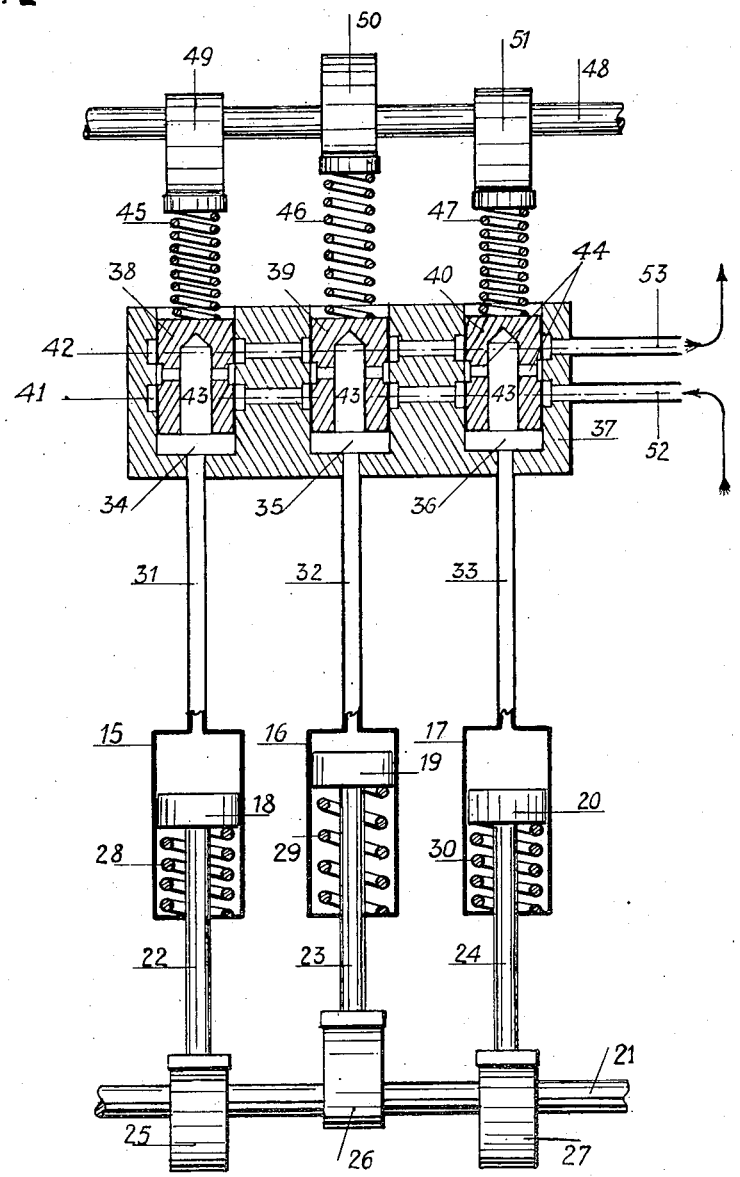

Feb. 5, 1952 P. G. J. M. AUDEMAR ET AL 2,584,659
HYDRAULIC TRANSMISSION SYSTEM FOR REPRODUCING
ROTARY MOVEMENTS AT A DISTANCE
Filed May 27, 1947 4 Sheets-Sheet 4

INVENTORS
PIERRE GUILLAUME JOSEPH MARIE AUDEMAR
PAUL LOUIS JULIEN GERARD
BY Otto Munk
THEIR ATTY Patented Feb. 5, 1952

2,584,659

UNITED STATES PATENT OFFICE 2,584,659

HYDRAULIC TRANSMISSION SYSTEM FOR REPRODUCING ROTARY MOVEMENTS AT A DISTANCE

Pierre Guillaume Joseph Marie Audemar, La Garenne-Colombes, and Paul Louis Julien Gerard, Paris, France, assignors to Olaer-Marine, Paris, France, a company of France Application May 27, 1947, Serial No. 750,848
In France May 24, 1946

Section 1, Public Law 690, August 8, 1946
Patent expires May 24, 1966

4 Claims. (Cl. 60—54.5)

This invention relates to hydraulic transmission for synchronously reproducing rotary movements at a distance.

It is already known to use hydraulic transmissions of the kind in which rotary movement of a driving shaft is transmitted through liquid columns to a receiving shaft for causing the same to rotate in synchronism with said driving shaft. Such hydraulic transmissions include generally a motor unit and a receiving unit, each comprising a group of cylinders having pistons therein connected with a crank-shaft and pipe lines connecting the cylinder heads in one unit with the cylinder heads in the other unit. The design of such hydraulic transmissions at present employed is such that the development of a leak will not be compensated at rest, in which case it will be impossible to prevent a shifting out of phase of one of the said units, that is to say a lag between said crank-shafts.

The present invention has for its primary object a new method for controlling the rotary movement of a receiving element, as for instance a driven shaft, which consists broadly in providing means for periodically and cyclically varying the pressure of liquid columns in accordance with the rotary movement of a master element, as for instance a driving shaft, said liquid columns acting on suitable pressure responsive elements, as for instance pistons in slave cylinders, operatively connected in staggered relation with said receiving element so as to cause said receiving element to rotate according to said pressure variations and to remain, at rest as well as in operation, always in phase with said master element.

A further object of the invention is to provide a new hydraulic remote control system for causing a receiving element to rotate according to periodic pressure variations controlled by a master element, and which is so designed that leakage is automatically compensated at rest as well as in operation by means of a source of liquid under pressure which is also adapted to increase the torque in such a manner, that the driving torque of the master element will only have to overcome frictions.

With these and other objects in view, the invention consists in the novel arrangement and formation of parts, as will be hereinafter more specifically described, claimed, and illustrated in the accompanying drawings in which drawings:

Fig. 1 is a diagrammatic view illustrating the principle of the invention.

Fig. 2 is a partial section of the hydraulic transmission embodying the invention.

Figs. 3, 4 and 5 show various examples of control means for periodically varying the pressure of the liquid in the transmission pipe lines.

Figs. 8 and 9 are explanatory diagrams of the embodiment disclosed in Fig. 7.

Figure 6:
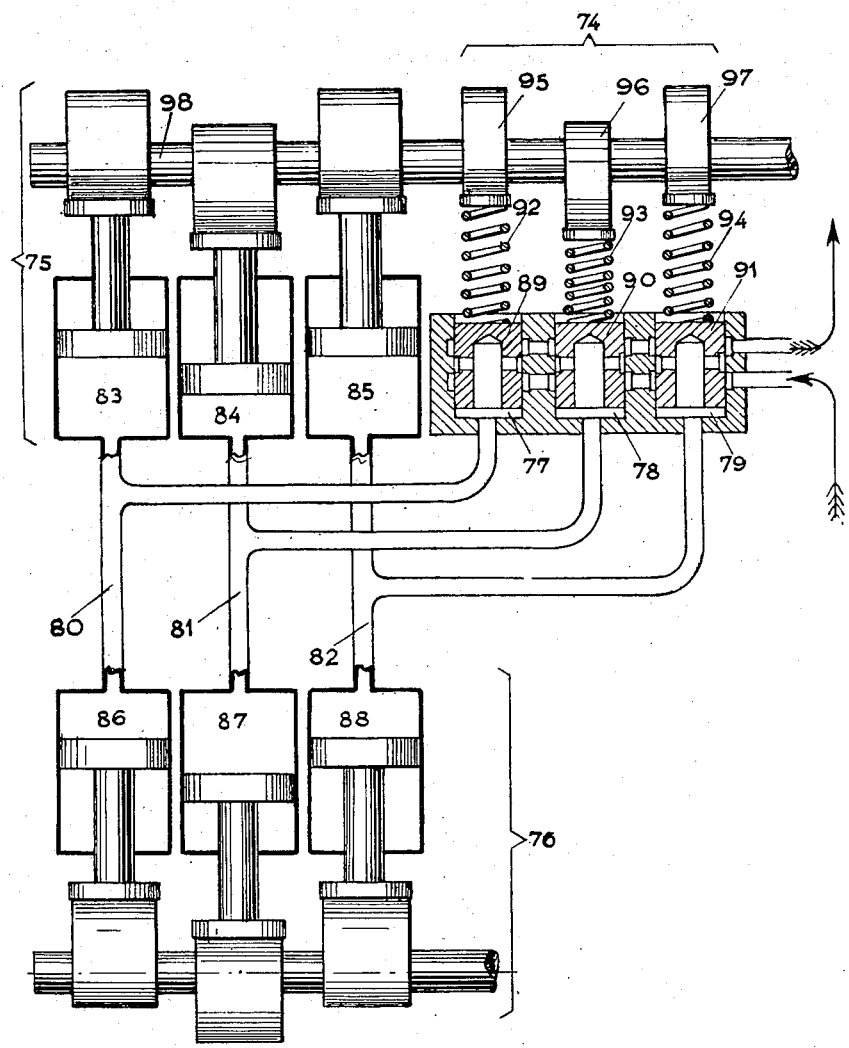
Fig. 6 shows a modified form of the invention comprising liquid pressure varying means as disclosed in conjunction with transmission pipe lines having a substantially constant volume.

The hydraulic remote transmission system according to the invention comprises a receiver unit having at least three slave cylinders whose pistons are connected with a driven shaft so as to have motions that may be represented as periodical functions, namely those varying substantially according to the sine law, suitably shifted through the angle of rotation of said driven shaft, and, on the other hand, control or distributing means permitting to impart variable pressures to the pistons in the slave cylinder, said pressures, supplied by an appropriate source of pressure, varying according to periodical functions.

Fig. 1 shows diagrammatically a receiver unit comprising three radially disposed slave cylinders 1, 2 and 3 having pistons 4, 5, and 6 connected with a driven shaft by means of connecting rods 8, 9, 10, respectively, and a common crank 11. Said slave cylinders communicate through suitable conduits 12, 13, and 14 respectively, with pressure distributing means for imparting, according to the rotation of a driving shaft, variable pressures to the pistons 4, 5 and 6, said pressures varying according to periodical functions suitably shifted, so that the thrusts of said pistons may have a resultant of substantially constant magnitude and whose direction varies according to the motion of the driving shaft, the position of said resultant determining at each instant the position of crank 11 of the driven shaft, hence that of this shaft.

Indeed, if by $P_1$, $P_2$ and $P_3$ are designated instantaneous values of the thrusts exerted by the operating liquid on the respective pistons of the receiving cylinders 1, 2, 3 and if there are admitted, for the laws of variation of said thrusts in function of the angle of rotation $\alpha$ of the driving shaft, the following expressions wherein A is initial pressure, e. g. atmospheric, and B is pressure variations with respect to A.

$$P_1 = A + B \cos \alpha$$

$$P_2 = A + B \cos \left(\alpha + \frac{2}{3}\pi\right)$$

$$P_3 = A + B \cos \left(\alpha + \frac{4}{3}\pi\right)$$

it will be found, by resolving the thrusts $P_1$, $P_2$, $P_3$ following the two rectangular axes $x$ and $y$ (Fig. 1) and by summing up the components following each of these axes, that the two components X and Y following those axes of the resultant of said thrusts may be expressed as follows:

$$X = 1.5 \, B \sin \alpha$$
$$Y = 1.5 \, B \cos \alpha$$

It results therefrom that the resultant of thrusts of the different receiving pistons may be represented by a vector of constant magnitude 1.5 B and of variable direction about the axis of the driven shaft following the motion of the driving shaft.

In the case of Fig. 1 the crank 11 of the driven shaft orients itself any instant in the direction of said resultant and thus follows in exact synchronism the angular motion of the driving shaft.

It is not necessary to dispose the slave cylinders in star fashion as shown in Fig. 1. They may as well be disposed for example in alignment as shown in Fig. 2, without departing from the principle of the invention, the driven connections between the pistons and the driven shaft being, in this case, set in a corresponding manner.

The receiving pistons may be provided with springs adapted to act against the thrust of the operating liquid, so that each piston has a fixed position which depends on the given pressure value. Such springs, however, may be avoided if the working pressure variation is such that the thrusts exerted by the pistons on the driven shaft give a resultant of constant intensity and variable direction, as above described.

As to the creation of cyclic pressure variations acting upon the receiving pistons, such variations may be produced by any suitable means, for instance such as illustrated in Figs. 2 to 5.

In the example shown in Fig. 2 each cylinder of the receiver unit is associated with a pressure regulator such as a liquid pressure reducing valve arranged in such a manner that the pressure of the liquid in said cylinders is determined by the action of a spring variably compressed by a cam according to the rotary motion of the driving shaft.

The transmission system shown in Fig. 2 comprises a receiver unit having three cylinders 15, 16 and 17 provided with pistons 18, 19 and 20, respectively, which are operatively connected with a driven shaft 21 by means of piston rods 22, 23 and 24 acting on cams 25, 26 and 27 suitably fixed on shaft 21. Pistons 18, 19 and 20 are provided with springs 28, 29 and 30, respectively, acting against the pressure of the operating liquid. The cylinders 15, 16 and 17 are connected by conduits 31, 32 and 33 to three separate pressure chambers 34, 35 and 36 provided in the body 37 of a pressure regulator or distributor. Valves 38, 39 and 40, slidably mounted in chambers 34, 35 and 36, permit to shut the said chambers and consequently the communication with cylinders 15, 16 and 17 or to connect these chambers either with a source of pressure liquid or with a discharge conduit. Each chamber 34, 35 and 36 is provided with two annular grooves 41 and 42 positioned above and below the movable valve member 38, 39 and 40 when the same are in their median position. Each piston 18, 19 and 20 has a hollow central portion 43 opening axially into the pressure chambers 34, 35 and 36 and radial passage 44 which remain closed when the valves 38, 39 and 40 are in their median position but which communicate with one or the other of grooves 41 and 42 when the said valves are in their upper or lower positions. These movable valve members 38, 39 and 40 are urged by springs 45, 46 and 47, respectively, which are compressed by the driving shaft 48 through cams 49, 50 and 51 mounted thereon, said cams being suitably set with respect to one another according to the setting of the driving means provided between pistons 18, 19 and 20 and the driven shaft 21. The grooves 41 and 42 of the pressure chambers 34, 35 and 36 are connected to a conduit 52, which supplies liquid under pressure, and to a discharge conduit 53.

In operation, each of said movable valve members 38, 39 and 40, submitted, on one side to the liquid pressure prevailing in the cylinders 15, 16 and 17 and, on the other side, to the action of springs 45, 46, and 47 compressed by the cams 49, 50 or 51 in function of the rotary motion or position of the driving shaft, places the corresponding cylinder in communication either with the supply conduit 52 or with the discharge conduit 53 according to compression or release of springs 45, 46 or 47, the movable valve members coming into their neutral position as soon as rotation of the driving shaft ceases. It results that the pressure imparted to each cylinder of the receiver unit varies according to the compression of springs 45, 46 and 47 determined by the angular position of the driving shaft and since these springs are compressed by the cams on the driving shaft with a suitable shift of phases similar to that of the receiver pistons, the driven shaft rotates in synchronism with the driving shaft. The same results may be obtained with a receiver unit such as shown in Fig. 1 when this unit is provided with pressure regulating means such as disclosed in Fig. 2.

In Fig. 3 is shown a modified form of the control means for varying the liquid pressure in the transmission pipe lines. According to this modified form, there is provided a distributing device 54 of the slide-valve type. The movable element of this device is designated by reference character 59. Reference character 60 shows a conduit fed with liquid under pressure from a source which is not visible on the drawing, and reference character 61 designates a discharge conduit, both conduits opening into the body of distributor 54. This distributor body is connected, on the other hand, at 55 to a corresponding slave cylinder. A spring R maintains the slide valve 59 in contact with a cam 58 secured on the driving shaft of the hydraulic transmission. In this case, the liquid pressure variations are obtained by rotation of cam 58 acting on slide-valve 59 which places periodically the corresponding transmission line 55 in communication with the liquid supply conduit 60 and with discharge conduit 61.

In Fig. 4 is shown a further disposition permitting to produce in a relatively simple way cyclic variations of pressures acting upon the receiver pistons such as described previously. In this disposition, a pressure intake 62 orientable about an axis and having, according to the number of cylinders, three or more open branch members 63, 64, 65 disposed angularly with respect to one another, is located in conduit 66 traversed by a liquid so that the dynamic pressure due to this flow is periodically added to, or subtracted from, the static pressure prevailing in each one of the said branch members according to variations in the orientation of these members with respect to the direction of said current, said members being respectively connected by means of suitable conduits to various cylinders of the receiving apparatus.

In Fig. 5 is shown yet a further disposition permitting to produce cyclic variations of pressures acting upon the receiving cylinders. In this disposition a provision is made for causing the conduits connected with various receiving cylinders to open into a liquid changing its level under the action of a force such example as the force of gravity or a centrifugal force. As shown in Fig. 5, this may be brought about by causing a cylindric tank 67 filled with liquid to rotate about its axis and several parallel conduits 68, 69, 70 to rotate integrally about an axis parallel to the tank axis, said conduits opening into said liquid through their curved portions 71, 72, 73 situated between the wall and the axis of said tank. It is clear that in this case the pressure prevailing in each cylinder will vary according to the corresponding curved portion, while rotating about the common axis, will move away from the axis of the tank toward the wall thereof, and vice-versa.

Shown in Fig. 6 is a modified form of transmission apparatus described precedingly. This form has for its object to avoid possible pressure disturbances due to the fact that the distributing or pressure regulating means in a system such as that shown in Fig. 2 are to assure the discharge of liquid necessary for filling each cylinder of each receiver. To this effect, the pressure regulating means, such as described in connection with Fig. 2 and indicated in their ensemble in Fig. 6 by the reference numeral 74, are associated with volumetric compensation means provided for example with cylinders and pistons and a receiver and indicated in their ensemble by reference numerals 75, 76, respectively. The compensating means 75 having the same strokes as has the receiver or an ensemble of receivers, the total volume of each element of the transmission remains constant so that the regulating means 74 have only to insure a reduced discharge and are capable of exerting an instantaneous action, thereby permitting the transmission to rotate with great speeds.

As shown in Fig. 6, the pressure chambers 77, 78, 79 of pressure regulating means 74 are directly connected with conduits 80, 81, 82 interconnecting, two by two, the cylinders 83, 84, 85 and 86, 87, 88 of the compensating means and receiver 75 and 76, whilst the slide-valves 89, 90, 91 of said regulating means are controlled by springs 92, 93, 94 actuated by cams 95, 96, 97 driven or carried by the shaft 98 controlling pistons of the compensating means 74. In this way, when the shaft 98 is rotated simultaneously with the displacement of pistons of the compensating means 75, causing the displacement of the liquid acting upon the receiver pistons 86, 87, 88, the pressure distributing means 74 imparts to each phase or element of the transmission a pressure of variable phase and amplitude in function of the motion of the driving shaft 98, said pressures actuating the receiving apparatus 76.

Figure 7:
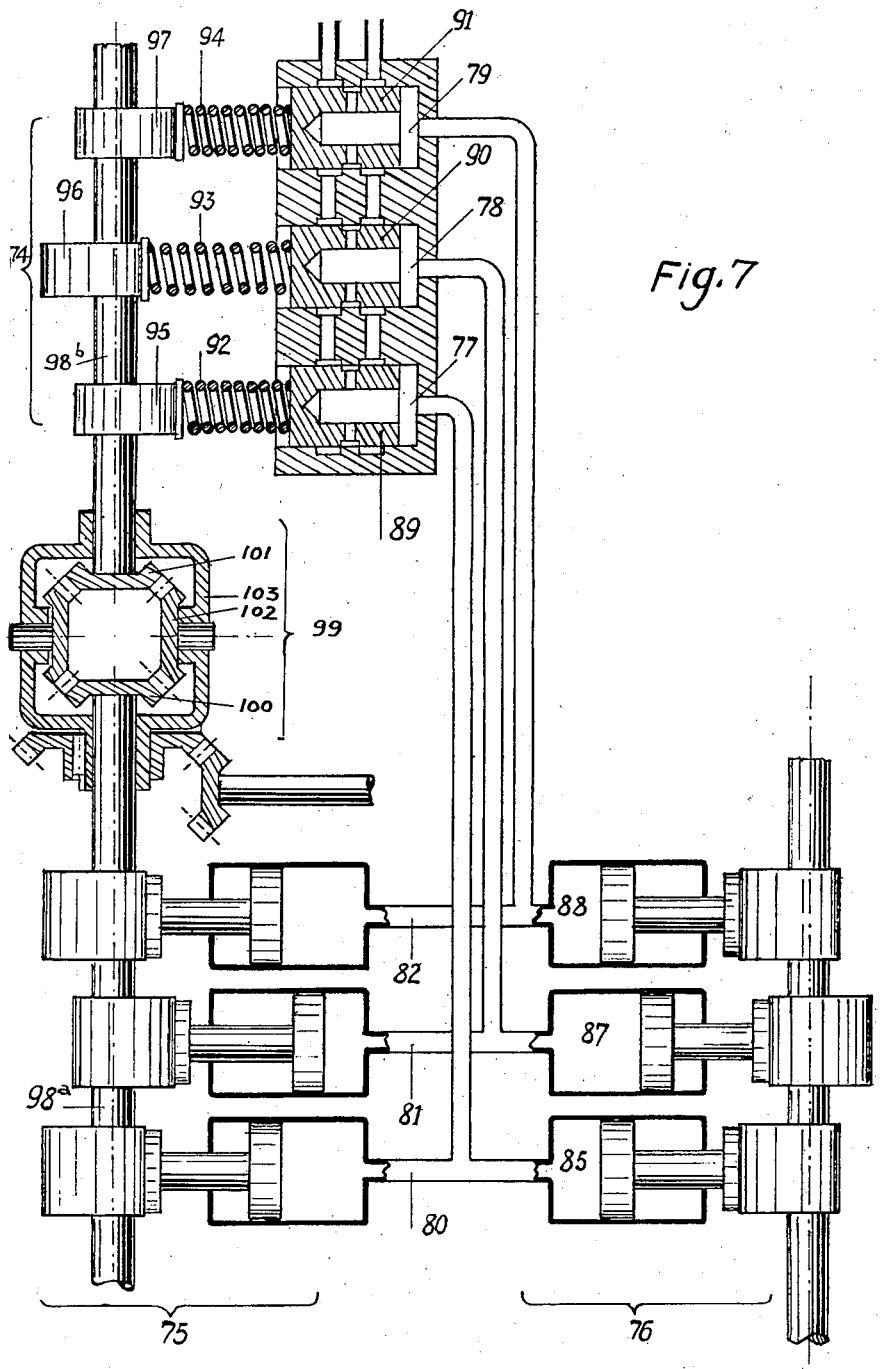
Fig. 7 is a view corresponding to Fig. 6 of a modification of a detail.

Shown in Fig. 7 is a system of transmission in which a displacement of given magnitude of a driving member determines a continuous rotation of the unit, the pressure distributing means insuring the discharge necessary for rotating the receiver or receivers of the whole transmitting apparatus. In this example the control of the receiver or receivers is effected with the aid of a volumetric device, for example a device comprising cylinders and pistons, branched into receiving means, preferably of same stroke and adapted to act as transmitter-motor under the impulse of the variable pressure distributing means and connected to the driving shaft of this transmitter through the medium of a differential mechanism of which two members are connected with the shaft of said transmitter and the shaft of distributor, respectively, and of which the third member constitutes the driving member and may be adjusted to call forth the shifting of phases between said transmitter and distributor, whereby there is brought about the rotation of said transmitter and, consequently, of the receiver as well as of the distributor.

As shown in Fig. 7, the transmission comprises a volumetric device 75 and a receiving device 76 with cylinders and pistons which may be identical with those shown in Fig. 6, this volumetric device and this receiving device being associated with each other and with a variable pressure distributing device 74 similar to the distributor shown in Fig. 6. The volumetric and distributing devices 75 and 74 are not mounted, in this case, on the same shaft but are associated with two separate shafts 98a, 98b loosely mounted for example by means of suitable bearings. These two shafts are interconnected by means of a differential mechanism causing these two shafts normally to rotate in synchronization in opposite directions and permitting to shift at will the phase of the motion of the whole distributing device with respect to that of the motion of the volumetric device. Said differential mechanism may be constituted by a differential gear 99 comprising for example planetary bevel gears 100, 101 mounted on the shafts 98a and 98b, respectively, and satellite gears 102 meshing with said planetary gears and carried by a frame 103 whose angular position may be regulated at will.

The operation of this system of transmission is as follows:

When the volumetric device is in a position of equilibrium, with the resultant of the thrusts of different pistons aligned following the axis of the common crank and directed from the end of the latter toward the shaft center, as is indicated in Fig. 8, the system is at rest. In order to set the system in operation, it suffices to displace through a given angle the cage 103 of the differential gear, thereby setting in motion the distributing device and causing the displacement of the resultant of the thrusts in the volumetric device on one side or the other with respect to the position occupied by this resultant in the state of equilibrium, as indicated in Fig. 9.

Under the effect of this shifting, the volumetric device sets to move and entrains, through the differential gear, the distributing device, thereby maintaining said shifting and a continuous rotation of the whole. It results therefrom that, in this case, the control of the transmission is effected simply by shifting in one sense or the other, by means of said differential gear, the phase of distributor with respect to that of the volumetric device. On the other hand, this form of transmitting apparatus does not necessitate any motor for actuating the driving shaft, such actuating being effected self-actingly by the volumetric device under the action of variable pressures produced in cyclic way by the distributing device when the latter is shifted with respect to the volumetric device.

The invention thus affords an improved system of transmission to a distance of angular motions or of the rotation of a member including the conveyance of continuous rotary motion, such as in machine drive, said system being based on the use, for controlling the receiving pistons, of the cyclic variations of pressures imparted to various pistons from a source of pressure.

It is not intended to limit the present invention to the precise details shown or described.

What we claim is:

1. In a system of transmitting angular motions of a driving shaft to a remote driven shaft, a pressure controlling device and a cylinder-and-piston-like compensating device cooperating with said pressure controlling device, said compensating device being suitably fluidly connected with at least one receiver provided with cylinders and pistons of total capacity equal to that of said compensating device, said pressure controlling device being controlled by the same shaft as that of said compensating device and connected with the conduits interconnecting the compensating cylinders and receiving cylinders.

2. In a system of transmitting angular motions of a driving shaft to a remote driven shaft, a pressure controlling device and a cylinder-and-piston-like volumetric device associated with said pressure controlling device, said volumetric device being suitably connected with at least one receiver provided with cylinders and pistons of total capacity equal to that of said volumetric device, said controlling device being fluidly connected with conduits connecting the capacities of said volumetric device with the receiving cylinders and having its driving shaft connected to the driving shaft of said volumetric device through the medium of a differential gear, said gear permitting both shafts to rotate by causing a lag between said pressure controlling device and said volumetric device, thereby determining the rotation of the ensemble.

3. A hydraulic system for remote control of a driven shaft, comprising a transmitter unit including a driving shaft, a receiver unit including a plurality of slave cylinders having pistons therein operatively connected in staggered relation with said driven shaft, transmission lines adapted to be filled with liquid connecting each of said slave cylinders with said transmitter unit, a source of substantially constant liquid pressure connected with said transmission lines, and means controlled by said driving shaft for periodically varying the pressure in said transmission lines and for controlling the liquid supply from said source according to said pressure variations.

4. A hydraulic system for remote control of a driven shaft, comprising a transmitter unit including a driving shaft, a plurality of cams mounted on said driving shaft and adapted to rotate therewith, a receiver unit including a plurality of slave cylinders having ipstons therein operatively connected in staggered relation with said driven shaft, transmission lines adapted to be filled with liquid connecting each of said slave cylinders with said transmitter unit, a source of substantially constant liquid pressure connected with said transmission lines, and means controlled by said driving shaft for periodically varying the pressure in said transmission lines and for controlling the liquid supply from said source according to said pressure variations, said means including a pressure governor containing a plurality of chambers, and movable slide valve members in said chambers, said slide valve members being actuated by said cams on said driving shaft.

PIERRE GUILLAUME
JOSEPH MARIE AUDEMAR.
PAUL LOUIS JULIEN GERARD.

REFERENCES CITED

The following references are of record in the file of this patent:

UNITED STATES PATENTS

| Number | Name | Date |
| --- | --- | --- |
| 603,173 | Clay | Apr. 26, 1898 |
| 1,318,143 | Haffner | Oct. 7, 1919 |
| 1,931,952 | Charles | Oct. 24, 1933 |

FOREIGN PATENTS

| Number | Country | Date |
| --- | --- | --- |
| 648,105 | France | Aug. 7, 1928 |
| 895,284 | France | Mar. 27, 1944 |